United States Patent [19]

Ailing

[11] Patent Number: 4,700,801
[45] Date of Patent: Oct. 20, 1987

[54] VEHICLE ANTITHEFT DEVICE

[76] Inventor: George B. Ailing, 10777 Julie Ave., Alliance, Ohio 44601

[21] Appl. No.: 689,295

[22] Filed: Jan. 7, 1985

[51] Int. Cl.$^4$ .............................................. B60R 25/04
[52] U.S. Cl. ..................................... 180/287; 70/237; 307/10 AT; 340/64; 180/286
[58] Field of Search ............. 180/287, 286; 307/10 R, 307/10 AT; 340/64; 70/237

[56] References Cited

U.S. PATENT DOCUMENTS

| | | | |
|---|---|---|---|
| 2,182,426 | 12/1939 | Courcier, Sr. | 180/286 |
| 2,382,985 | 8/1945 | Fitzgerald | 70/237 |
| 2,876,856 | 3/1959 | Greene | 180/286 |
| 3,054,282 | 9/1962 | Bacon | 180/287 |
| 3,166,144 | 1/1965 | Price | 180/286 |
| 3,541,505 | 11/1970 | Lee | 180/287 |
| 3,921,130 | 11/1975 | O'Donnell et al. | 180/286 |
| 4,123,924 | 11/1978 | Dworkis | 180/287 |
| 4,137,985 | 2/1979 | Winchell | 180/286 |
| 4,151,508 | 4/1979 | Hensler et al. | 180/287 |
| 4,180,796 | 12/1979 | Palafox | 180/287 |
| 4,313,520 | 2/1982 | Chester | 180/287 |

FOREIGN PATENT DOCUMENTS 63115 8/1955 France ................... 180/82

Primary Examiner—Richard A. Bertsch
Attorney, Agent, or Firm—Frease & Bishop

[57] ABSTRACT

An antitheft device for a vehicle that includes a deadbolt mounted on the vehicle door for providing security to the vehicle door. The deadbolt operates a normally closed switch which is in series circuitry with the vehicle battery, starter and ignition key switch. The deadbolt and switch are arranged so that the switch is open when the deadbolt is in locked position and the switch is closed when the deadbolt is in unlocked position.

3 Claims, 5 Drawing Figures

VEHICLE ANTITHEFT DEVICE

BACKGROUND OF THE INVENTION

1. Field of the Invention

The present invention relates to an antitheft device for an automobile or other vehicle, and more particularly the invention relates to a combination locking device and cooperative ignition circuit interrupting device which will prevent or substantially deter the surrepitious entry and theft of a vehicle.

2. Description of the Prior Art

Alarm systems for vehicles and antitheft devices for automobiles and other vehicles are of a considerable variety. A multitude of devices have been devised to operate in a variety of ways.

For example, various alarm systems are known in which an alarm is sounded by tampering with an automobile. Other devices are known in which an alarm sounds unless certain activities are performed after entering an automobile within a given time to disable the alarm. Other types of alarms are known in which an alarm may sound where an improper sequence of events are followed in an attempt to start an automobile.

Other antitheft devices have been proposed in which means are included to disable the ignition circuitry unless certain activities are performed in proper sequence. Likewise, it is standard in the automobile industry to include locking devices connected with the steering mechanism of the automobile to prevent the automobile from being driven without proper insertion of a key in a lock to unlock the steering system.

In virtually all prior devices, the sophistication of the device is such that it is a simple manner to override a power alarm or locking device, or the device is so sophisticated and complicated that its expense becomes prohibitive for wide-spread public use.

The problem of automobile theft, however, is so serious that many inducements, such as advertising campaigns designed to urge a motorist to properly lock his automobile, automobile insurance premium reductions for devices installed to retard theft have been offered. Such inducements, however, have been largely unsuccessful in reducing incidences of automobile theft.

Accordingly, a substantial need exists for an inexpensive, reliable, simply operated and easily installed device which will substantially reduce the probability or likelihood of automobile theft. Further, a desirable characteristic of such device includes the fact that the present of such a device of the type indicated is not readily discernible from the outside appearance of the automobile.

This last-mentioned fact is important because time is a key factor in automobile theft. That is, if a thief is to steal a car without towing it away, he must do so in a very short period of time to reduce the likelihood of discovery. Accordingly, it is desirable to provide a device which will substantially increase the amount of time necessary to override or destroy the antitheft device to the point where the risk involved in attempting to steal an automobile, because of the time factor, is so great that the thief will not attempt theft of the automobile.

In addition to an increased degree of mechanical security, it is desirable that such an antitheft device include means for interrupting the electrical circuitry or include some other electrical or electronic components. However, such electrical circuitry should not be such that it provides any substantial drain upon the battery of the vehicle.

Accordingly, it is an object of the present invention to provide a vehicle antitheft device which includes mechanical security to deter or retard entry into a vehicle.

It is a further object of the invention to provide an improved vehicle antitheft device in which the mechanical security portion or lock cooperates with electrical circuitry to interrupt the ignition circuit of the vehicle so that the engine of the vehicle cannot be started when the device is in locked position.

It is a further object of the invention to provide a vehicle antitheft device in which positive action on the part of the driver is required to enable the ignition circuitry, such positive action being in addition to that positive action required by the standard ignition and starter switch of all vehicles commercially sold in this country.

These and other objects and advantages may be obtained by the improved vehicle antitheft device of the present invention, the general nature of which may be stated as including a deadbolt lock mounted in a secure fashion in the door of an automobile operable by a key or in conjunction with other security switches, enabling switch means which is operable by the deadbolt lock and arranged in such fashion that the switch is open when the deadbolt lock is closed and the switch is closed when the deadbolt lock is open, said switch being included in the circuitry with the starter of the automobile, the battery or other power source of the automobile and the standard ignition switch. The antitheft device is thus operated by opening or moving the deadbolt lock to an open position which action closes the switch in the ignition circuitry to allow the automobile engine to be started in normal fashion. Upon closing or locking the deadbolt lock, the antitheft switch is placed in open position so that the ignition circuitry of the automobile cannot be completed and, therefore, prevent the vehicle from being started. Other features may be operably connected to the device, such as a signal device to indicate to the owner or authorized user of the automobile that the deadbolt lock is in open position when the operator leaves the vehicle. Other objects and advantages will be apparent from the following description.

BRIEF DESCRIPTION OF THE DRAWING

A preferred embodiment of the invention—illustrative of the best mode in which applicant has contemplated applying the principles—is set forth in the following description and shown in the drawing and is particularly and distinctly set forth in the appended claims.

In the drawing.

Similar numerals refer to similar parts throughout the various figures of the drawing.

DESCRIPTION OF THE PREFERRED EMBODIMENT

In the construction of the present invention, the lock and associated switch mechanism are diagrammatically illustrated at 10 as they may be mounted on or in connection with the door of an automobile or other vehicle. The door is illustrated at 11 which is hinged at 12 to permit access to and from the interior of an automobile in normal fashion. The automobile body is illustrated generally at 13 and includes a standard frame 14 and side panel 15 which are diagrammatically illustrated in FIGS. 1 through 3.

Figure 1:
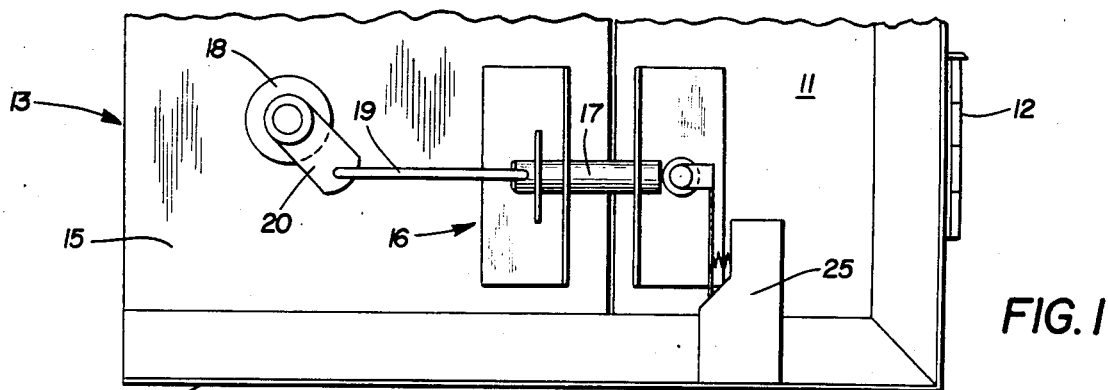
FIG. 1 is a diagrammatic elevational view showing the deadbolt and ignition interrupter switch of the present invention with the deadbolt in closed or locked position and the switch in open position.
Figure 2:
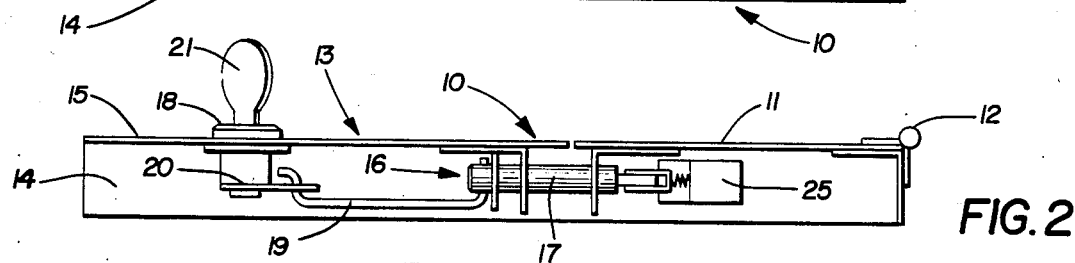
FIG. 2 is a plan view of the construction shown in FIG. 1.
Figure 3:
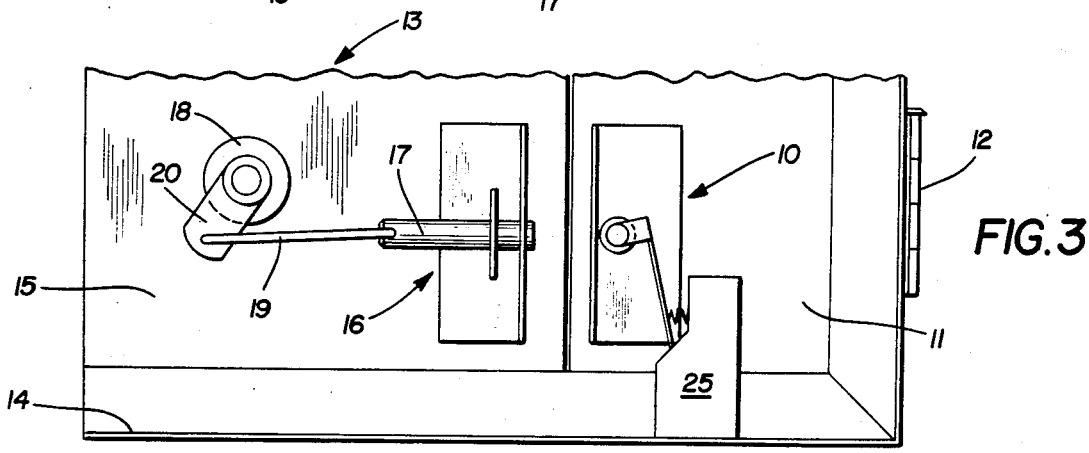
FIG. 3 is a plan view diagrammatically showing the deadbolt lock of the present invention in open position and the ignition enabling switch in closed position.

In accordance with the present invention, a deadbolt generally indicated at 16 is mounted in the interior side of the automobile body and includes bolt member 17, keylock 18 and operating means 19. As diagrammatically illustrated, operating means 19 consists of a lever attached at one end to the bolt 17 and at the other end to toggle 20 of keylock 18. Thus, as toggle 20 is rotated by key 21 in keylock 18, the bolt 17 may be moved selectively from closed position, as shown in FIG. 1, to opened position, as shown in FIG. 3. Other well known means of operating deadbolt 17 by keylock 18 may be employed as, for example, a rack and pinion type construction. However, these bolt operating systems are well known in the locking art. Within the scope of the present invention the bolt 17 is operated by keylock 18 between open and closed positions. The deadbolt 17 of the lock member prevents, when the bolt is in closed or locked position, the door from being opened without manipulating lock 18. The deadbolt may be located in any convenient position in connection with an automobile or vehicle door where the bolt passes between the automobile door and a location in the automobile body adjacent to the door.

It should be apparent that the area surrounding the deadbolt may be reinforced with any suitable material to prevent the deadbolt from surreptious manipulation or other entry.

Figure 4:
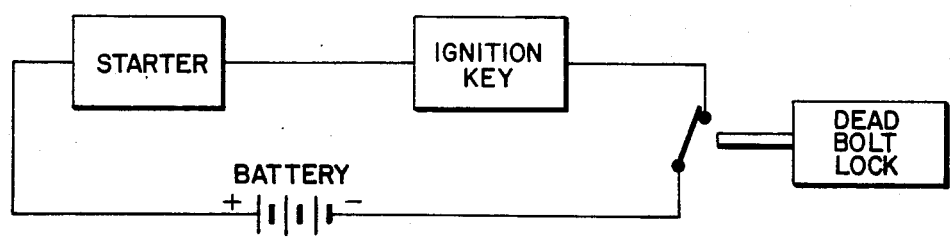
FIG. 4 is a circuit diagram showing the circuitry of the various components of the present invention with the switch in closed position and the deadbolt lock in open position.
Figure 5:
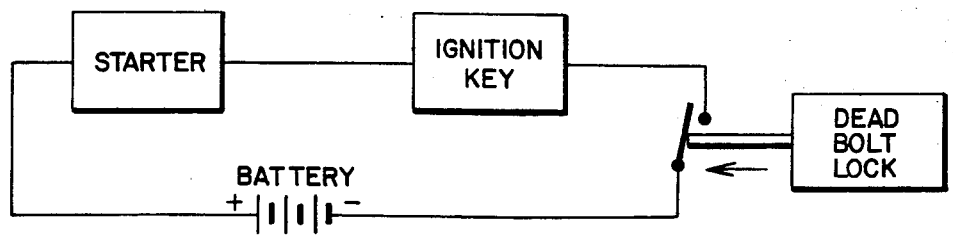
FIG. 5 is a circuit diagram showing the various components of the present invention with the deadbolt lock in the closed or locked position and the circuit switch in the opened position.

In accordance with the invention, a switch 25 is operably located adjacent the deadbolt for movement between open and closed positions by deadbolt 17. Thus, switch 25, illustrated diagrammatically in FIGS. 1 through 3, may be moved from open position, as shown in FIG. 1, when deadbolt 17 is closed or locked, to switch-closed position (FIG. 3) when deadbolt 17 is moved to open position. Switch 25 which is also located in the interior of the automobile door, is in series circuit with the automibile power source shown as the battery, FIGS. 4 and 5, the automobile starter, and the automobile ignition key switch.

Therefore, in accordance with the present invention, the standard ignition key switch, which is operated by a driver to operate the starter and run the engine of the automobile, may only be activated when switch 25 is closed. Likewise, the ignition key switch will not activate the starter when the deadbolt lock has moved into locked position, thereby opening switch 25, to break the series circuit between the battery starter and ignition switch.

Thus, it can be seen that in order for the automobile to be operated when the antitheft device of the present invention is incorporated in the automobile construction, the deadbolt lock must be operated by the automobile operator to move the deadbolt to open position. Upon leaving the vehicle unattended, the operator of the vehicle locks lock 18 to move deadbolt 17 into closed position and open switch 25. Thus, the circuit between the ignition and the starter and the battery will be broken to prevent operation of the vehicle's engine.

While the deadbolt is in closed position, the bolt itself will provide a substantial amount of mechanical security to the vehicle. Likewise, the deadbolt, in closed position, interrupts the ignition circuit of the automobile, thereby preventing "jumping" of the ignition key switch—a common practice in surreptious operation of motor vehicles.

The device of the present invention can be located in many convenient areas in the automobile or it can be incorporated into the standard door latching system of most commercial vehicles. Likewise, it should be understood that the switch 25 may be located in either the automobile body or door and the deadbolt located in the opposite member, the requirement being that the deadbolt serves to lock the door in closed position when the bolt is locked, and to maintain switch 25 in open position when the door is locked.

It should be apparent that existing burglar alarm devices can be used in conjunction with the antitheft device of the present invention, and other convenient features can be used such as a signal to indicate to an automobile operator that the deadbolt is in open position when the operator leaves a vehicle. Also, the device of the present invention can be used in conjunction with other security features now being routinely incorporated in automobile construction, such as electronic combination locks and electronic alarm systems.

When the device of the present invention is used with the additional security features described above, it adds additional time to that necessary to gain unauthorized entry into an automobile. Where the device of the present invention is used, it will in most instances require too much time for an unauthorized user to gain access to the vehicle to make it worth his while to attempt such unauthorized use. In short, the only feasible way to gain use of an automobile equipped with the device of the present invention would be to tow the vehicle to a location where the time necessary to gain access to the vehicle would be unimportant.

Accordingly, the device of the present invention provides a simple, economical and efficient device for deterring unauthorized access to a vehicle. Further, the device provides a positive mechanical locking means for preventing unauthorized access to the vehicle, and at the same time provides a positive interruption in the ignition electrical circuitry so that the automobile may not be used in an unauthorized manner by "jumping" the ignition switch.

Finally, an important aspect of the present invention is that the antitheft construction can be incorporated in a vehicle without any outward signs of its presence. Thus, a potential unauthorized user would be unaware of its presence in a vehicle, and the unauthorized user would be thwarted in his attempts to gain access thereto.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved vehicle antitheft device is constructed, assembled and operated, the characteristics of the new construction, and the advantageous, new and useful results obtained; the new and useful structures devices, elements, arrangements, parts and combinations are set forth in the appended claims.

I claim:

1. Vehicle antitheft device construction for a vehicle including a vehicle frame, a vehicle door mounted on the frame, an ignition switch and a starter operable in response to closing the ignition switch, said door being movable from open to closed positions to prevent access to the vehicle interior when in closed position, said ignition switch being operable from the vehicle interior at a position spaced from the door, dead bolt lock means mounted on the vehicle for operation from locked to unlocked position between the frame and the door, security means for operating the dead bolt lock, said security means being operable from the exterior of the vehicle, normally closed switch means in series circuit with the ignition switch and starter, said switch being operable by said dead bolt lock to open said switch when said dead bolt is in locked position, and said dead bolt locking said door in closed position when said dead bolt is in locked position, whereby said starter can only be operated by said ignition switch when said dead bolt lock is in unlocked position and said switch means is closed.

2. Vehicle antitheft device construction as defined in claim 1 in which said dead bolt lock means is mounted in the interior of the vehicle on the door, in which said security means is key operated from the exterior of the vehicle, in which said normally closed switch is mounted in the vehicle interior on the frame, and in which said dead bolt extends between the door and frame when in locked position.

3. Vehicle antitheft device construction as defined in claim 1 in which said dead bolt lock means is mounted in the interior of the vehicle on the frame, in which said security means is key operated from the exterior of the vehicle, in which said normally closed switch is mounted in the vehicle interior on the door, and in which said dead bolt extends between the door and frame when in locked position.

* * * * *